(12) United States Patent
Yamaguchi

(10) Patent No.: US 12,351,287 B2
(45) Date of Patent: Jul. 8, 2025

(54) WATERCRAFT MANEUVERING CONTROL APPARATUS, AND WATERCRAFT MANEUVERING SYSTEM

(71) Applicant: YAMAHA HATSUDOKI KABUSHIKI KAISHA, Iwata (JP)

(72) Inventor: Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 333 days.

(21) Appl. No.: 17/725,595

(22) Filed: Apr. 21, 2022

(65) Prior Publication Data

US 2022/0388619 A1 Dec. 8, 2022

(30) Foreign Application Priority Data

Jun. 8, 2021 (JP) .................. 2021-096115

(51) Int. Cl.
*B60L 3/00* (2019.01)
*B63B 79/10* (2020.01)
*B63B 79/40* (2020.01)
*B63H 21/21* (2006.01)
*G01C 21/20* (2006.01)
*G05D 1/00* (2006.01)

(52) U.S. Cl.
CPC ............. *B63H 21/21* (2013.01); *B63B 79/10* (2020.01); *B63B 79/40* (2020.01); *G01C 21/203* (2013.01); *G05D 1/0206* (2013.01)

(58) Field of Classification Search
CPC ......... B63H 21/21; B63B 79/40; B63B 79/10; G01C 21/203; G05D 1/0206
See application file for complete search history.

(56) References Cited

U.S. PATENT DOCUMENTS

| 2016/0101838 | A1 | 4/2016 | Kojima |
| 2016/0334792 | A1* | 11/2016 | Jopling ................ G05D 1/0206 |
| 2021/0206460 | A1* | 7/2021 | Hawker .................. B63B 79/10 |
| 2021/0347449 | A1* | 11/2021 | Dake ....................... B63B 69/00 |

FOREIGN PATENT DOCUMENTS

| JP | 54-38097 A | 3/1979 |
| JP | 2016-80432 A | 5/2016 |

* cited by examiner

*Primary Examiner* — Adam M Alharbi
(74) *Attorney, Agent, or Firm* — Keating & Bennett, LLP

(57) ABSTRACT

A watercraft maneuvering control apparatus for controlling a propulsion device of a watercraft includes an obstacle sensor to detect an obstacle around the watercraft, a pattern sailing commander operated by a user to provide a command to sail the watercraft in a sailing pattern, and a controller configured or programmed to control the propulsion device. The controller is configured or programmed to function as a pattern sailing controller to control the propulsion device to sail the watercraft in the sailing pattern, an expected sailing water area computer to compute an expected sailing water area when the watercraft is sailed in the sailing pattern, and a pattern sailing intervener to suspend or cancel the pattern sailing of the watercraft when the obstacle sensor detects an obstacle interfering with the expected sailing water area.

8 Claims, 12 Drawing Sheets

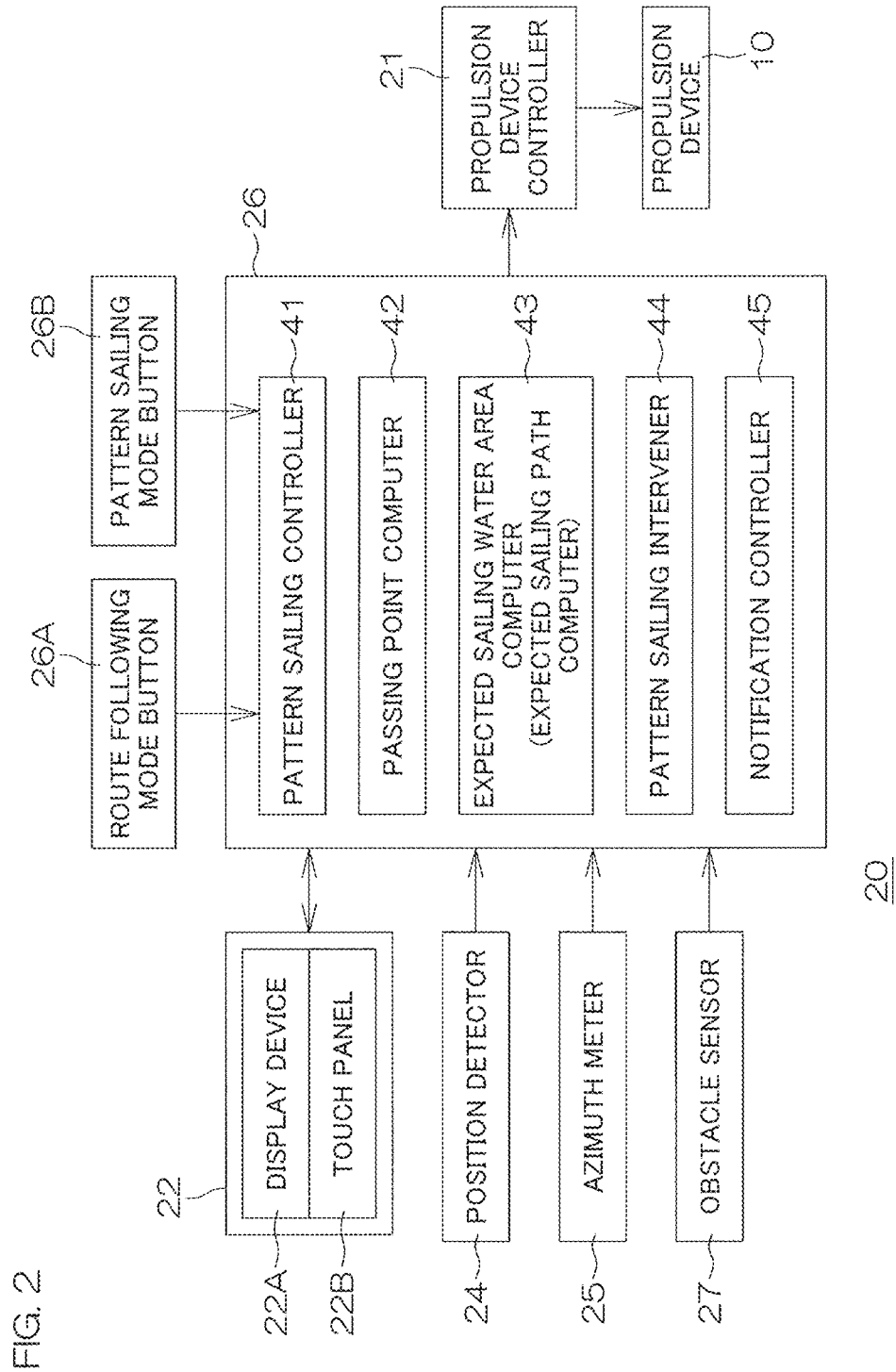

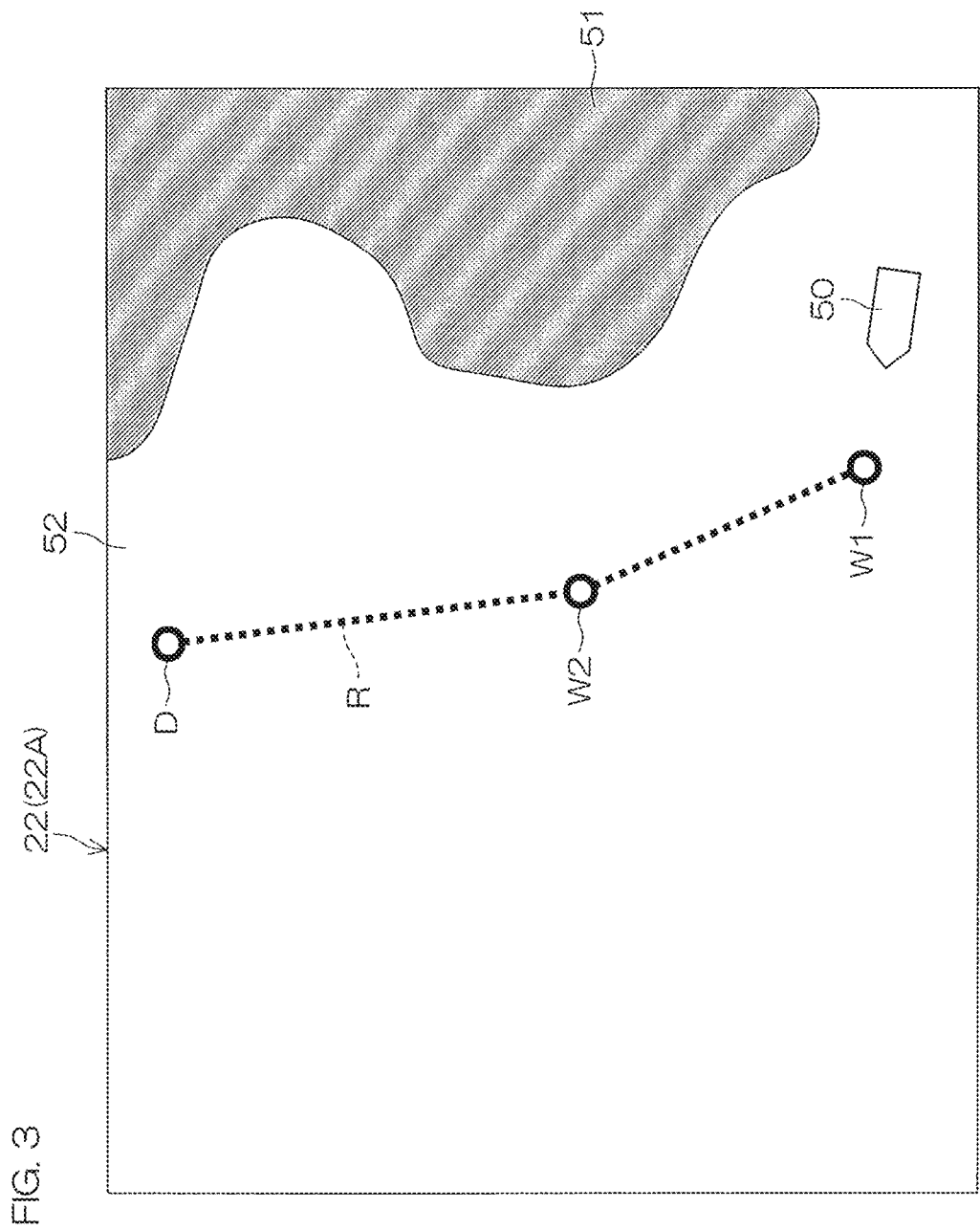

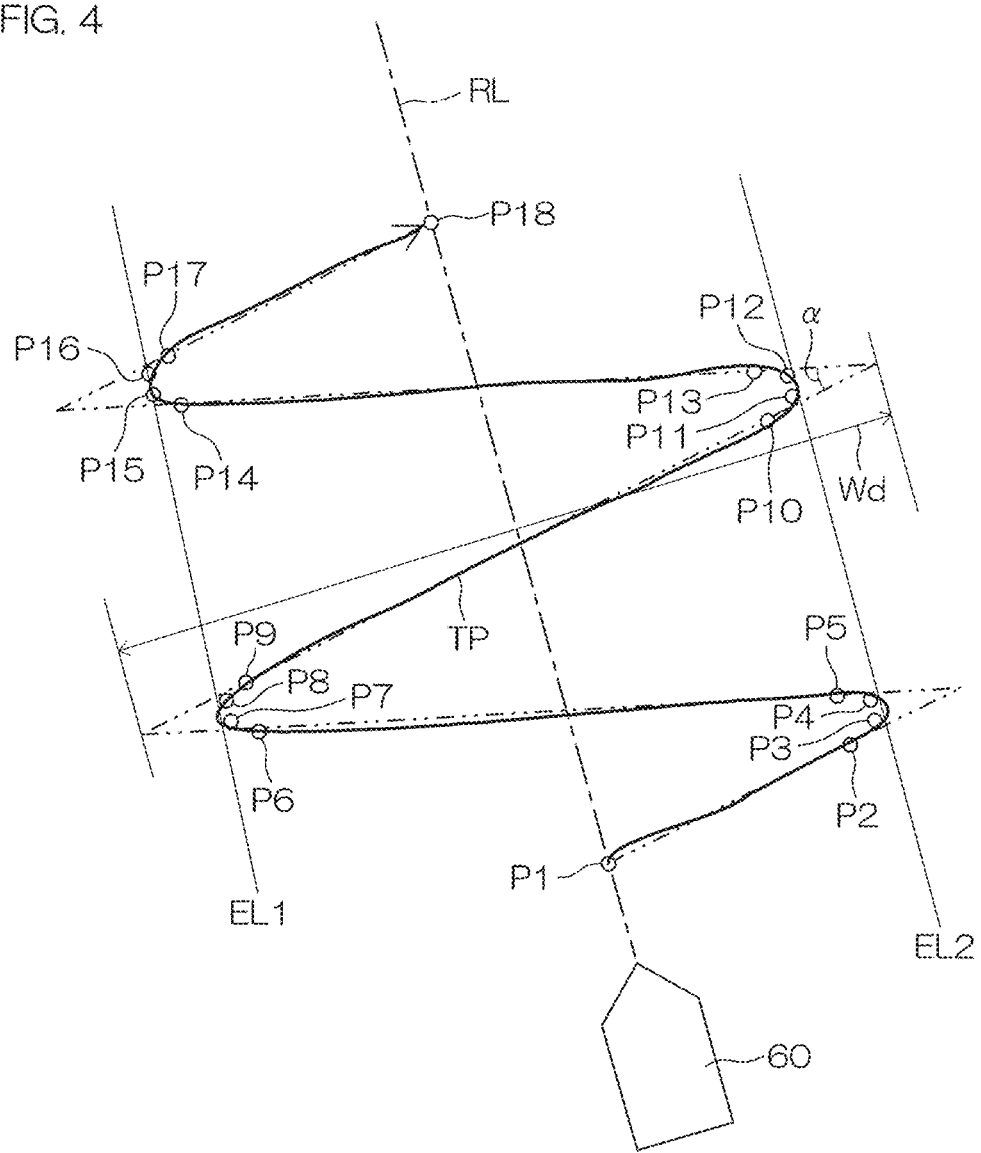

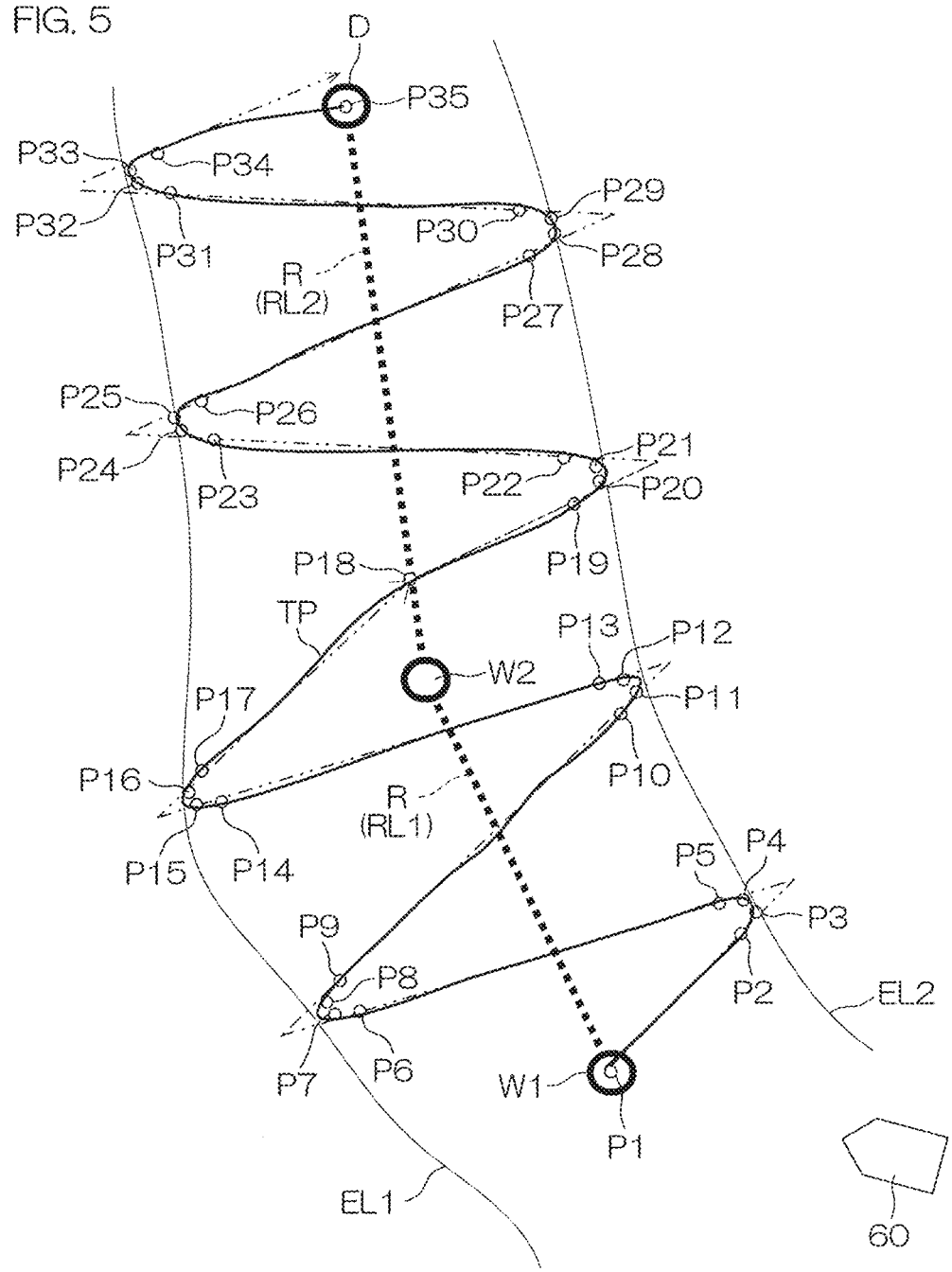

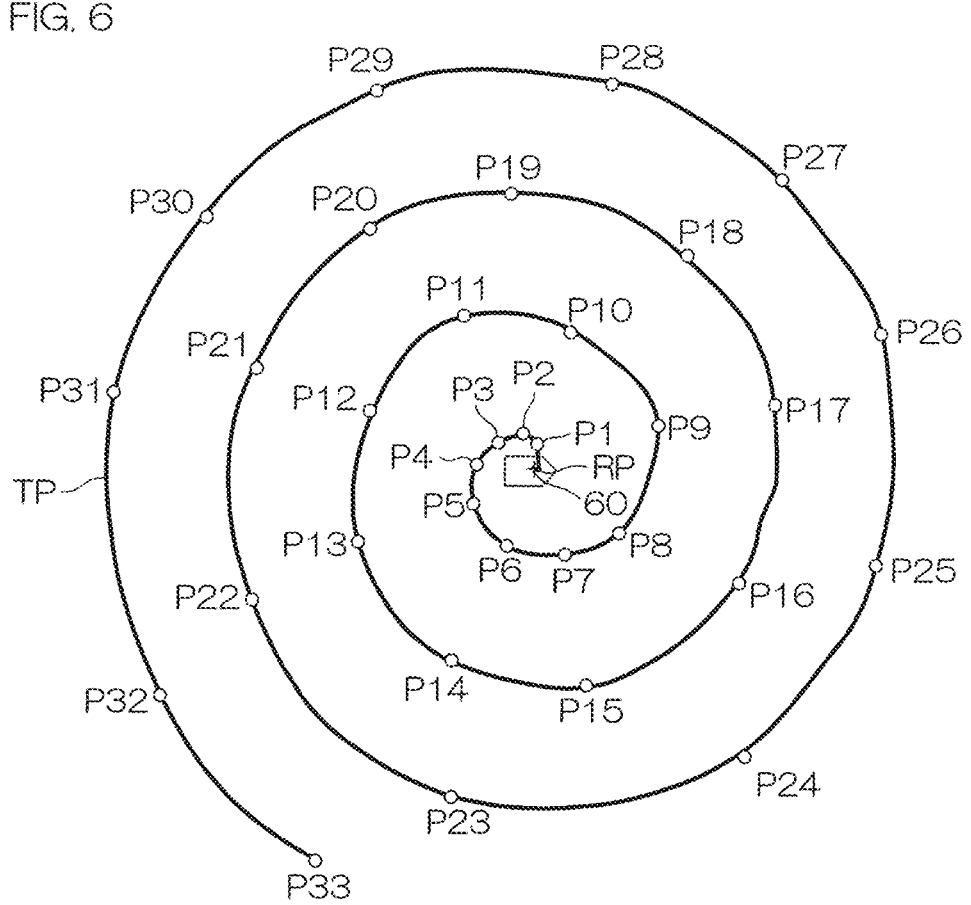

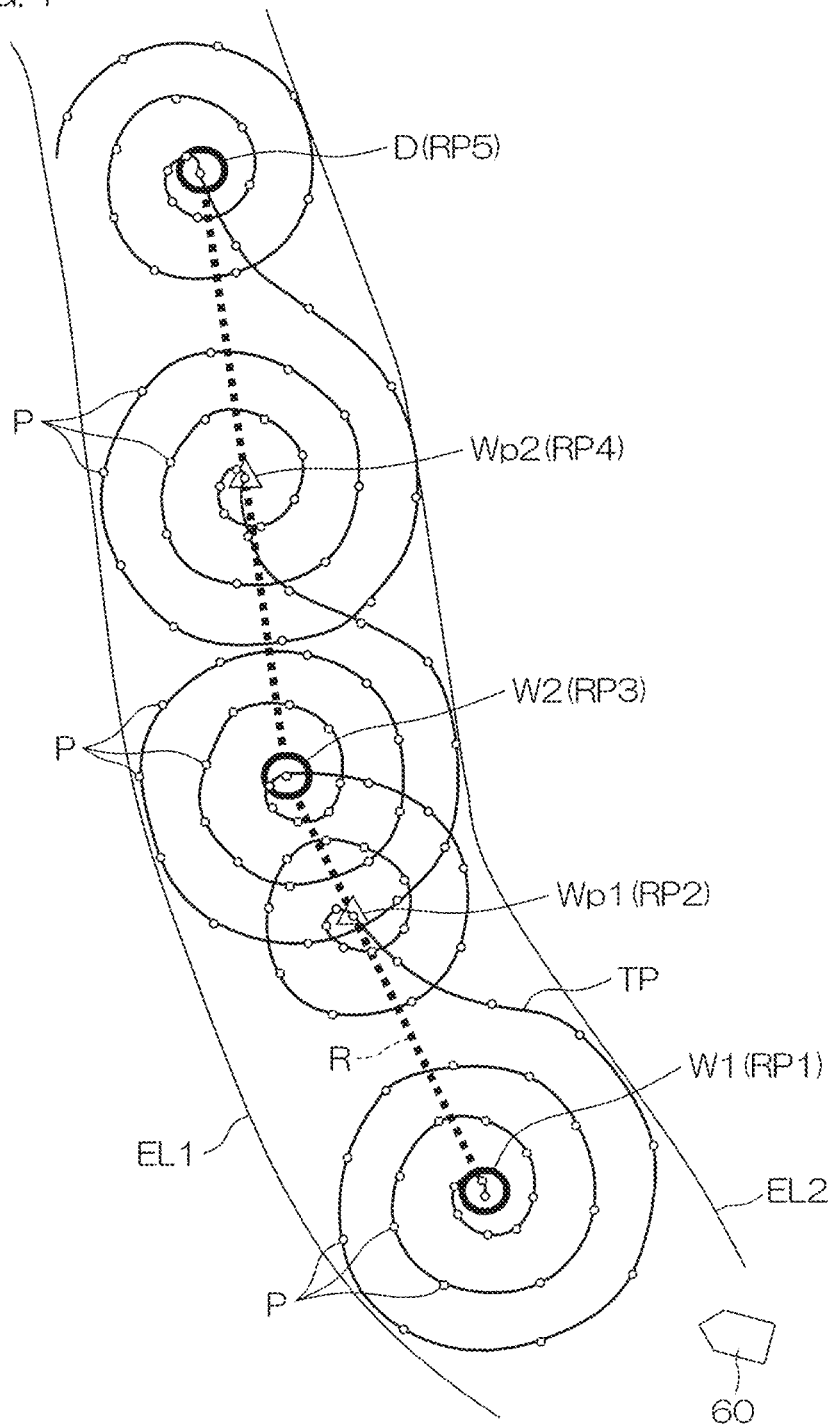

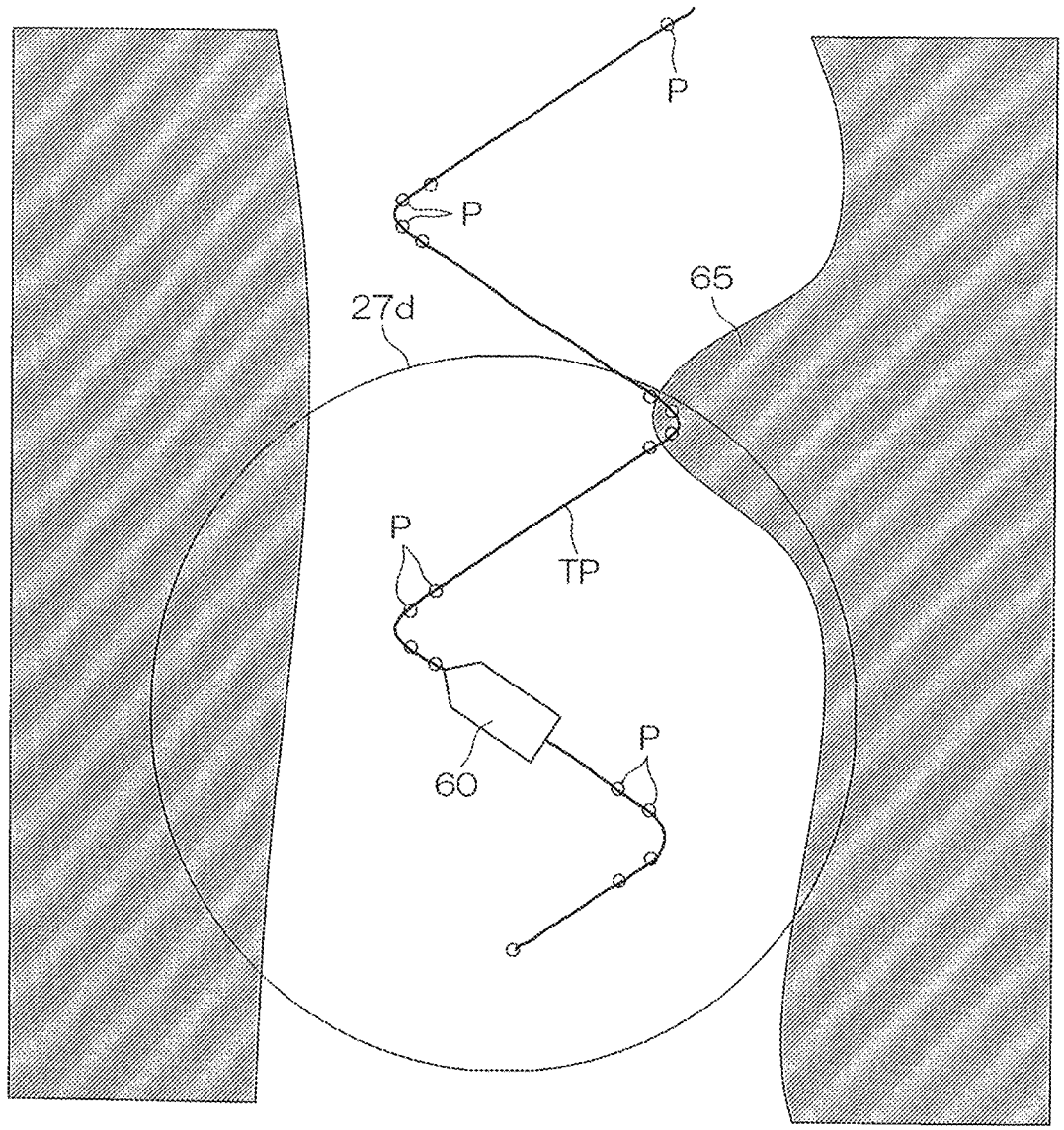

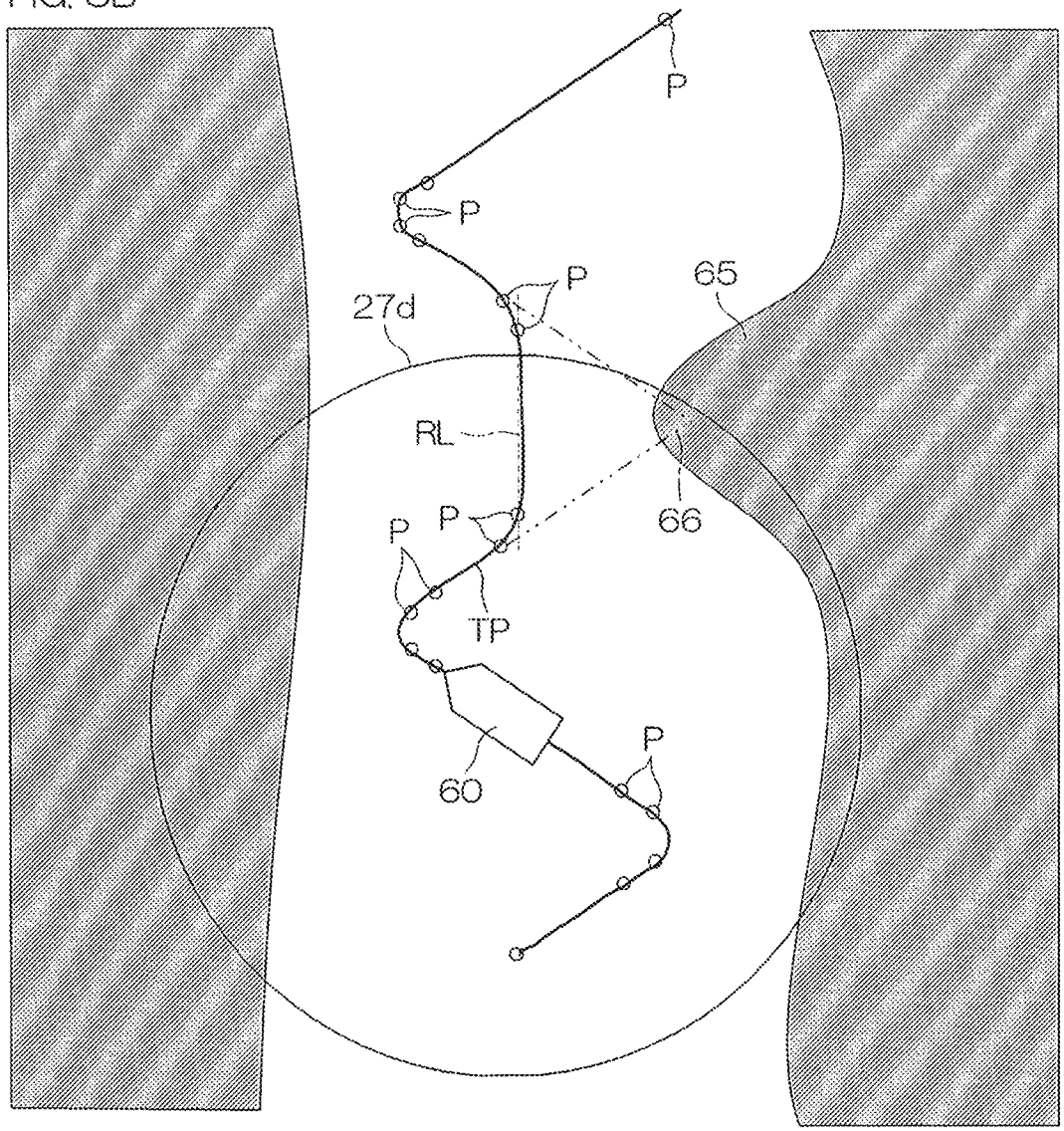

WATERCRAFT MANEUVERING CONTROL APPARATUS, AND WATERCRAFT MANEUVERING SYSTEM

CROSS REFERENCE TO RELATED APPLICATIONS

This application claims the benefit of priority to Japanese Patent Application No. 2021-96115 filed on Jun. 8, 2021. The entire contents of this application are hereby incorporated herein by reference.

BACKGROUND OF THE INVENTION

1. Field of the Invention

The present invention relates to a watercraft maneuvering control apparatus, and a watercraft maneuvering system.

2. Description of the Related Art

Small-scale watercrafts generally referred to as pleasure boats are mainly used for marine recreation. When a small-scale watercraft such as a motor boat is used for fishing, for example, the watercraft is often sailed while searching for a fish shoal. For example, the watercraft is sailed to follow a sailing path of a predetermined pattern while scanning the sea. Typically, the watercraft is sailed to follow a sailing path of a zig-zag pattern.

The operator of the watercraft is required to have a significant watercraft maneuvering skill in order to steer the watercraft to follow the sailing path of the predetermined pattern. To this end, an automatic watercraft maneuvering system for the pattern steering is often mounted on the watercraft. In a typical conventional art, the user inputs a command for the pattern steering, so that the watercraft is automatically steered to follow a sailing path of a zig-zag pattern having a predetermined amplitude with respect to a center line defined along the current traveling direction of the watercraft.

JP-SHO54(1979)-38097-A discloses a method for stopping a watercraft in an emergency. In this method, the watercraft is steered alternately rightward and leftward to a maximum steering angle by operating a steering drive motor while reversing the rotation of a main propeller driving mechanism. However, this method is directed to the emergency stopping of the watercraft, and is substantially different from the automatic steering for scanning the sea.

SUMMARY OF THE INVENTION

The inventor of preferred embodiments of the present invention described and claimed in the present application conducted an extensive study and research regarding a watercraft maneuvering control apparatus, such as the one described above, and in doing so, discovered and first recognized new unique challenges and previously unrecognized possibilities for improvements as described in greater detail below.

Even with the use of the automatic steering function, the user is required to pay attention to a situation around the watercraft. If the user determines that the situation is not proper for continuing the automatic steering, the user interrupts the automatic steering to switch to manual watercraft maneuvering. If the user expects that the watercraft is likely to approach too close to land or any other watercraft during the automatic zig-zag pattern steering, for example, the user interrupts the automatic steering.

On the other hand, the automatic pattern steering is generally utilized when the user desires to be freed from the steering operation in order to do other work, e.g., in order to search for a fish shoal. In this regard, the inventor of the present invention considers that a more convenient watercraft maneuvering system can be provided by imparting the system with a user assisting function to assist the user in determining the situation around the watercraft and taking a proper action against the situation during the automatic watercraft maneuvering operation utilizing the pattern steering.

Preferred embodiments of the present invention provide watercraft maneuvering control apparatuses that each increase the convenience of a watercraft maneuvering operation utilizing a pattern sailing function, and watercraft maneuvering systems including the same.

In order to overcome the previously unrecognized and unsolved challenges described above, a preferred embodiment of the present invention provides a watercraft maneuvering control apparatus which controls a propulsion device of a watercraft. The watercraft maneuvering control apparatus includes an obstacle sensor to detect an obstacle around the watercraft, a pattern sailing commander operable by a user to provide a command to sail the watercraft in a predetermined sailing pattern, and a controller configured or programmed to control the propulsion device. The controller is configured or programmed so as to function as a pattern sailing controller to control the propulsion device to sail the watercraft in the predetermined sailing pattern according to the command provided by the pattern sailing commander; an expected sailing water area computer to compute an expected sailing water area when the watercraft is sailed in the predetermined sailing pattern according to the command provided by the pattern sailing commander; and a pattern sailing intervener to suspend or cancel the predetermined pattern sailing of the watercraft when the obstacle sensor detects an obstacle that will interfere with the expected sailing water area.

With this arrangement, the user operates the pattern sailing commander to provide the command so that the pattern sailing controller controls the propulsion device to automatically sail the watercraft in the predetermined sailing pattern (hereinafter referred to as "pattern sailing"). On the other hand, the expected sailing water area computer computes the expected sailing water area through which the watercraft is expected to sail by the pattern sailing. When the obstacle sensor detects the obstacle that interferes with the expected sailing water area around the watercraft, the pattern sailing intervener intervenes the pattern sailing to suspend or cancel the pattern sailing. Therefore, the watercraft maneuvering control apparatus is able to assist the user in properly coping with a situation around the watercraft during the pattern sailing making it possible to more conveniently maneuver the watercraft by utilizing the pattern sailing function.

The expression "a situation around the watercraft" refers to a situation in an area within a predetermined distance from the watercraft, the distance having an upper limit equivalent to a detection range of the obstacle sensor. In this case, it is preferred to properly define the predetermined distance so as to avoid the detected obstacle by suspending or canceling the pattern sailing.

Where an object present at a position interfering with the expected sailing water area should be properly avoided by canceling the predetermined pattern sailing, the obstacle sensor detects the object as the obstacle. Typical examples of the obstacle include land, land fixtures (bridge pier, jetty, breakwater, pier, and the like), fjords, other watercrafts, and above-water/under-water fixtures (stationary fishing tools and the like).

The expression "the obstacle interferes with the expected sailing water area" means not only that the obstacle is present within the expected sailing water area, but also that the expected sailing water area approaches within a predetermined distance from the obstacle.

Typical examples of the obstacle sensor include a LiDAR (Light Detection and Ranging), a radar (Radio Detecting and Ranging), and a millimeter wave radar. Another possible example of the obstacle sensor is a combination of a GNSS (Global Navigation Satellite System) and map data by which the obstacle such as land, bridge pier, jetty, breakwater or pier around the current position of the watercraft can be detected. Specifically, where a pier is specified as the destination (object) by the navigation system, the destination (object) may be regarded as the obstacle when the distance between the destination and the watercraft is less than the predetermined distance, and the pattern sailing may be suspended or canceled.

The tem "suspend" means that the pattern sailing is temporarily stopped and may be resumed later. The term "cancel" means that the pattern sailing is stopped and is not basically assumed to be resumed.

An example of the predetermined sailing pattern is a zig-zag sailing pattern in which the watercraft is sailed zig-zag along a reference line. Another example of the predetermined sailing pattern is a spiral sailing pattern in which the watercraft is sailed along a spiral course about a reference position gradually away from the reference position. The predetermined sailing pattern may be any of various sailing patterns in which the watercraft is sailed to follow various sailing paths.

The expected sailing water area may be a sailing path itself along which the watercraft is sailed, i.e., an expected sailing path. Further, the expected sailing water area may be a region which encompasses the expected sailing path (e.g., a band-shaped zone surrounded by an envelope line defined with respect to the expected zig-zag sailing path).

In a preferred embodiment of the present invention, the controller is configured or programmed to function as a passing point computer to compute a plurality of passing points through which the watercraft is to pass sequentially in accordance with time. The passing point computer computes the plurality of passing points so that the watercraft follows a sailing path of the predetermined sailing pattern according to the command provided by the pattern sailing commander. The pattern sailing controller controls the propulsion device so that the watercraft sequentially passes through the plurality of passing points. The expected sailing water area computer computes, as the expected sailing water area, an expected sailing path which passes through the plurality of passing points.

With this arrangement, when the command for the pattern sailing is provided, the plurality of passing points are computed so that the watercraft follows the sailing path of the predetermined sailing pattern, and the propulsion device is controlled so that the watercraft passes sequentially through the plurality of passing points. Then, the expected sailing path passing through the plurality of passing points is computed, and the expected sailing path is utilized as the expected sailing water area. That is, when the obstacle sensor detects the obstacle interfering with the expected sailing path, the pattern sailing is suspended or canceled.

Thus, information of the expected sailing water area is obtained by utilizing information of the plurality of passing points computed for the pattern sailing. Therefore, the pattern sailing function is more conveniently utilized with a smaller amount of computation.

In a preferred embodiment of the present invention, when the pattern sailing intervener suspends or cancels the predetermined pattern sailing of the watercraft, the passing point computer recomputes the plurality of passing points so as to provide an obstacle avoidance course which causes the watercraft to avoid the obstacle detected by the obstacle sensor.

With this arrangement, when the pattern sailing is suspended or canceled in response to the detection of the obstacle interfering with the expected sailing water area, the plurality of passing points are recomputed so as to provide the obstacle avoidance course. Thus, the obstacle is avoided by automatically maneuvering the watercraft. This makes the pattern sailing function more convenient.

In a preferred embodiment of the present invention, after the pattern sailing intervener suspends the predetermined pattern sailing of the watercraft, the pattern sailing controller controls the propulsion device to resume the predetermined pattern sailing of the watercraft in a state such that the obstacle sensor no longer detects the obstacle interfering with the expected sailing water area.

With this arrangement, the pattern sailing is suspended when the obstacle interfering with the expected sailing water area is detected, and the pattern sailing is resumed when the obstacle interfering with the expected sailing water area is no longer detected. Thus, the pattern sailing is properly and automatically suspended and resumed. This makes the pattern sailing function still more convenient.

In a preferred embodiment of the present invention, the watercraft maneuvering control apparatus further includes a route setter operable by the user to set a route along which the watercraft is to sail. When the route is set by the route setter, the pattern sailing controller controls the propulsion device to sail the watercraft in the predetermined sailing pattern along the set route.

With this arrangement, the watercraft sailing route is set and the pattern sailing is carried out on the set route. This makes the pattern sailing function more convenient. Particularly, the pattern sailing function is easily utilized by setting the route in consideration of an environment around a region in which the pattern sailing function is utilized.

In a preferred embodiment of the present invention, the pattern sailing controller controls the propulsion device so as to sail the watercraft in the predetermined sailing pattern with respect to the current position of the watercraft when the route is not set by the route setter.

With this arrangement, the pattern sailing is carried out with respect to the current position of the watercraft when the route is not set. In this case, the pattern sailing is properly suspended or canceled when the obstacle interfering with the expected sailing water area is detected by the obstacle sensor. Therefore, the pattern sailing function is easily utilized even if the route is not set.

When the route is not set, the pattern sailing may be carried out with respect to the current azimuth of the watercraft (bow azimuth) as well as the current position of the watercraft.

Another preferred embodiment of the present invention provides a watercraft maneuvering system including a propulsion device and the above-described watercraft maneuvering control apparatus to control the propulsion device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a block diagram for explaining the functional configuration of an autopilot controller.

FIG. 3 is a diagram for explaining an exemplary route setting operation to be performed by a route setter.

FIG. 4 is a diagram for explaining an exemplary pattern sailing (zig-zag pattern sailing) to be carried out with a route following mode not selected.

FIG. 5 shows an exemplary zig-zag pattern sailing to be carried out with the route following mode selected.

FIG. 6 shows an exemplary spiral pattern sailing to be carried out with the route following mode not selected.

FIG. 7 shows an exemplary spiral pattern sailing to be carried out with the route following mode selected.

FIGS. 8A and 8B are diagrams for explaining an exemplary operation to be performed by a pattern sailing intervener.

DETAILED DESCRIPTION OF THE PREFERRED EMBODIMENTS

Figure 1:
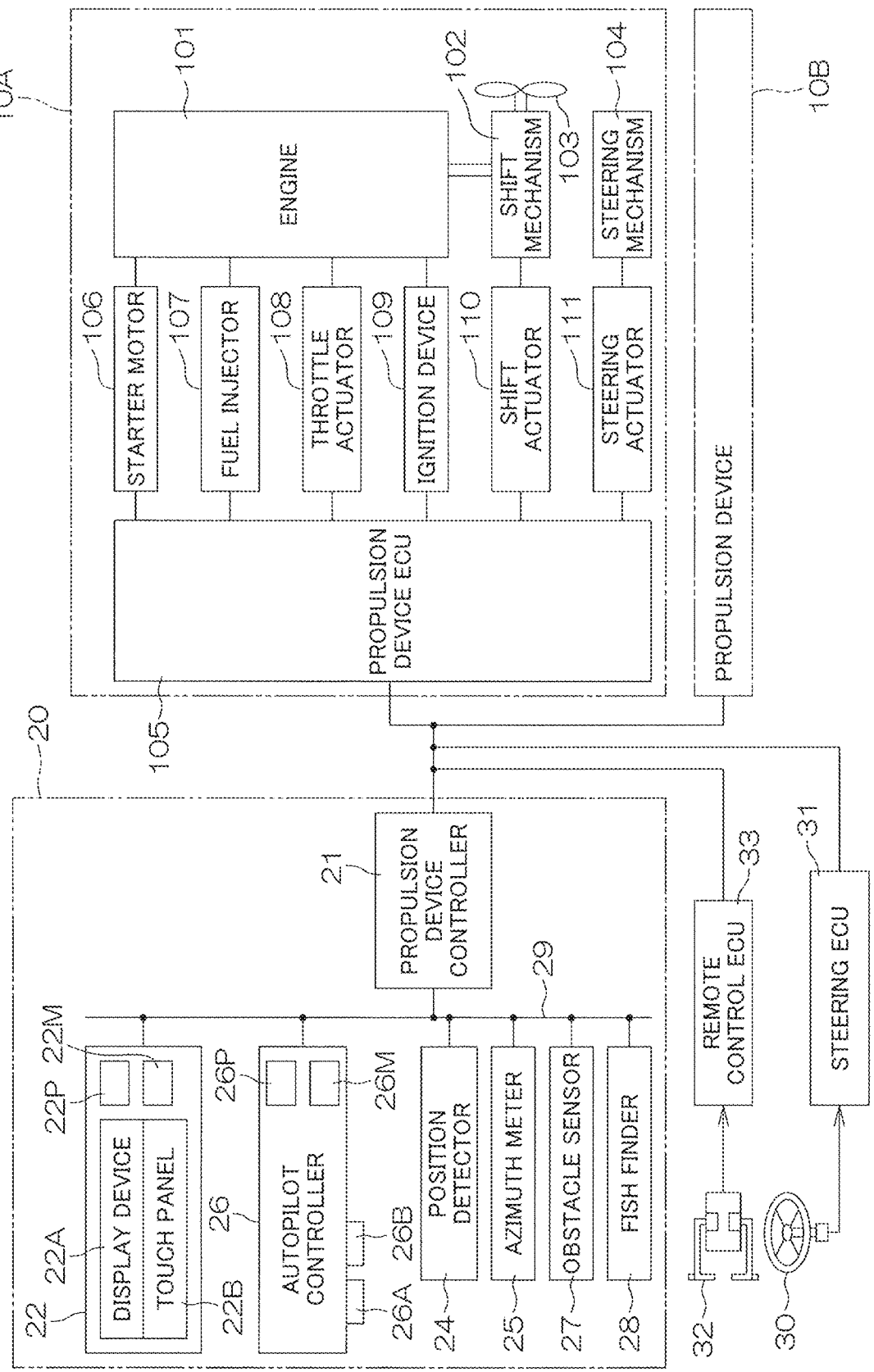
FIG. 1 is a block diagram for explaining the construction of a watercraft maneuvering system according to a preferred embodiment of the present invention.

FIG. 1 is a block diagram for explaining the construction of a watercraft maneuvering system according to a preferred embodiment of the present invention. The watercraft maneuvering system is mounted for use in a watercraft. The watercraft may be a small watercraft called a pleasure boat.

The watercraft maneuvering system includes propulsion devices 10A, 10B (which are generally referred to as "propulsion device 10") and a watercraft maneuvering control apparatus 20. The watercraft maneuvering system further includes operation units 30, 32 which are operated by a user to maneuver the watercraft.

In a preferred embodiment of the present invention, the propulsion device 10 includes a plurality of propulsion devices (more specifically, two propulsion devices). Of course, the propulsion device 10 may include a single propulsion device, or may include three or more propulsion devices. The propulsion device 10 may be an outboard motor provided on the stern of the watercraft, and the outboard motor may be an engine outboard motor or an electric outboard motor. In FIG. 1, the engine outboard motor is shown by way of example.

The propulsion device 10 provided in the form of engine outboard motor includes an internal combustion engine 101, a shift mechanism 102, a propeller 103, a steering mechanism 104, and the like. Power generated by the engine 101 is transmitted to the propeller 103 via the shift mechanism 102. The steering mechanism 104 laterally changes the direction of a propulsive force generated by the propulsion device 10. In the case of the outboard motor, the outboard motor is laterally turned with respect to a hull of the watercraft. The shift mechanism 102 is configured so that the shift position thereof can be selected from a forward drive position, a reverse drive position, and a neutral position. When the shift position is the forward drive position, the rotation of the engine 101 is transmitted to the propeller 103 to rotate the propeller 103 in a normal or forward direction. When the shift position is the reverse drive position, the rotation of the engine 101 is transmitted to the propeller 103 to rotate the propeller 103 in a reverse direction. When the shift position is the neutral position, the transmission of the power between the engine 101 and the propeller 103 is prevented.

The propulsion device 10 further includes a propulsion device ECU 105, a starter motor 106, a fuel injector 107, a throttle actuator 108, an ignition device 109, a shift actuator 110, a steering actuator 111, and the like. The propulsion device ECU 105 controls the operations of the starter motor 106, the fuel injector 107, the throttle actuator 108, the ignition device 109, the shift actuator 110, and the steering actuator 111. The starter motor 106 is an electric motor which starts the engine 101. The fuel injector 107 injects fuel to be combusted in the engine 101. The throttle actuator 108 is an electric actuator (typically including an electric motor) which actuates a throttle valve of the engine 101. The ignition device 109 ignites an air-fuel mixture in a combustion chamber of the engine 101, and typically includes an ignition plug and an ignition coil. The shift actuator 110 actuates the shift mechanism 102. The steering actuator 111 is a drive source for the steering mechanism 104, and typically includes an electric motor. The steering actuator 111 may include a hydraulic device of an electric pump type.

The watercraft maneuvering control apparatus 20 includes a propulsion device controller 21, a route setter 22, a position detector 24, an azimuth meter 25, an autopilot controller 26, and an obstacle sensor 27. In a preferred embodiment of the present invention, the watercraft maneuvering control apparatus 20 further includes a fish finder 28. The propulsion device controller 21, the route setter 22, the position detector 24, the autopilot controller 26, the obstacle sensor 27 and the fish finder 28 are connected to each other via a communication line 29 (e.g., inboard local area network).

The route setter 22 includes a display device 22A and a touch panel 22B. The display device 22A may be a two-dimensional display device such as a liquid crystal display or an organic EL display. The touch panel 22B is provided on a display screen of the display device 22A. An output signal of the touch panel 22B is outputted to the communication line 29. The user operates the touch panel 22B to change the display screen of the display device 22A, and operates buttons (software keys) displayed on the display screen to operate the various devices. In a preferred embodiment of the present invention, the route setter 22 functions as the route setter operable by the user to set a route along which the watercraft is sailed.

The route setter 22 includes a processor 22P and a memory 22M. A program and data are stored in the memory 22M. The data include map data. The processor 22P functions to read out the map data from the memory 22M and display a nautical chart on the display device 22A by executing the program. The user is able to set the watercraft sailing route by operating the touch panel 22B while viewing the displayed nautical chart.

An example of the position detector 24 is a GNSS (Global Navigation Satellite System) receiver. The GNSS receiver receives radio waves from artificial satellites, and generates position data and moving speed data on earth. Of these, at least the position data is outputted to the communication line 29. The azimuth meter 25 generates azimuth data indicating the azimuth of the watercraft, more specifically, the azimuth of the bow of the watercraft. The azimuth data is outputted to the communication line 29. The route setter 22 displays the current position and the current azimuth of the watercraft on the nautical chart displayed on the display device 22A based on the position data and the azimuth data. For example, the current position of the watercraft is represented by the position of a watercraft icon located on the nautical chart, and the current azimuth of the watercraft (bow azimuth) is represented by the direction of the watercraft icon.

The autopilot controller 26 performs an automatic watercraft maneuvering operation. A route following mode button 26A and a pattern sailing mode button 26B are connected to the autopilot controller 26. The route following mode button 26A is an operation switch operable by the user to select an automatic watercraft maneuvering mode (route following mode) in which the watercraft is sailed along the route set by the route setter 22. The pattern sailing mode button 26B is an operation switch operable by the user to select an automatic watercraft maneuvering mode (pattern sailing mode) in which the watercraft is sailed to follow a sailing path of a predetermined pattern (hereinafter referred to as "pattern sailing"), and is an example of the pattern sailing commander. When a plurality of sailing patterns are available, the pattern sailing mode button 26B may double as a sailing pattern selecting switch to select one of the patterns. For example, the sailing pattern may be selected by repeatedly operating the pattern sailing mode button 26B.

The autopilot controller 26 includes a processor 26P and a memory 26M. A program and data are stored in the memory 26M. The processor 26P executes the program to perform a computing operation and a control operation for the automatic watercraft maneuvering. Specifically, the computing operation and the control operation are performed for the automatic watercraft maneuvering in the route following mode and/or the pattern sailing mode.

Route information set by the route setter 22, position information generated by the position detector 24, and azimuth information generated by the azimuth meter 25 are inputted to the autopilot controller 26, which in turn supplies a propulsion device control command for the automatic watercraft maneuvering to the propulsion device controller 21. The propulsion device control command includes at least a steering control command and, as required, a propulsive force control command. The propulsion device controller 21 controls the propulsion device 10 according to the propulsion device control command. Specifically, the propulsion device controller 21 supplies a control command to control the steering angle of the propulsion device 10 according to the steering control command to the propulsion device ECU 105. Further, the propulsion device controller 21 supplies a control command to control the magnitude of the propulsive force to be generated by the propulsion device 10 according to the propulsive force control command (and, as required, further controlling the shift position of the propulsion device 10) to the propulsion device ECU 105. The autopilot controller 26 and the propulsion device controller 21 are examples of the controller which controls the propulsion device 10.

The obstacle sensor 27 detects an obstacle around the watercraft, and outputs information of the position of the obstacle (obstacle position information) to the communication line 29. The obstacle position information may be information of the relative position of the obstacle with respect to the current position of the watercraft. Further, the obstacle sensor 27 may acquire information of the current watercraft position from the position detector 24, then compute information of the absolute position of the obstacle, and output the absolute position information as the obstacle position information. The autopilot controller 26 acquires the obstacle position information outputted to the communication line 29, and performs necessary computation and control operations. The route setter 22 may acquire the obstacle position information outputted to the communication line 29, and may display the position of the obstacle on the nautical chart displayed on the display device 22A.

In a preferred embodiment of the present invention, the obstacle sensor 27 is configured so as to have a detection area within a predetermined radius about the watercraft, and detect an obstacle present in the detection area. Specifically, the obstacle to be detected is an object which may obstruct the sailing of the watercraft. Typical examples of the obstacle include land, land fixtures (bridge pier, jetty, breakwater, pier and the like), fjords, other watercrafts, above-water/under-water fixtures (stationary fishing tools and the like). Further, an object floating on or in the water, e.g., aquatic plants (algae and the like) propagating on or in the water, may also be the obstacle to be detected.

Typical examples of the obstacle sensor 27 include a LiDAR (Light Detection and Ranging), a radar (Radio Detecting and Ranging), and a millimeter wave radar.

The fish finder 28 is a device which detects a fish shoal in the water around the watercraft. Data indicating the results of the detection is supplied to the route setter 22 via the communication line 29, and is displayed on the screen of the display device 22A. The pattern sailing mode may be used to find a fish shoal by scanning in water with the fish finder 28 while sailing the watercraft in the predetermined sailing pattern (a zig-zag pattern or a spiral pattern).

In a preferred embodiment of the present invention, the operation units 30, 32 include a steering wheel 30 and a remote control lever 32. A steering ECU (electronic control unit) 31 and a remote control ECU 33 are provided in association with the steering wheel 30 and the remote control lever 32, respectively. The steering ECU 31 and the remote control ECU 33 are connected to the propulsion device controller 21 and the propulsion device ECU 105 in a communicable manner. However, the steering ECU 31 and the remote control ECU 33 may be connected to the propulsion device ECU 105 for communication with the propulsion device ECU 105 via the propulsion device controller 21.

The steering wheel 30 is an operation member to be operated by the user to set the traveling direction of the watercraft, i.e., to manually steer the watercraft. In a preferred embodiment of the present invention, the direction of the propulsive force generated by the propulsion device 10 is laterally changed according to the operation of the steering wheel 30 to steer the watercraft. The remote control lever 32 is an operation member to be operated by the user to set and/or adjust the shift position of the propulsion device 10 and the output of the propulsion device 10, i.e., the direction and the magnitude of the propulsive force to be generated by the propulsion device 10. In a preferred embodiment of the present invention, two remote control levers 32 are provided in association with the two propulsion devices 10. The ECUs 31, 33 are configured and programmed so as to generate signals according to the operation directions and the operation amounts of the corresponding operation members, and input the signals to the propulsion device controller 21.

FIG. 2 is a block diagram for explaining the functional configuration of the autopilot controller 26. As described above, the processor 26P executes the program stored in the memory 26M so that the autopilot controller 26 operates as various functional processing units. Examples of the functional processing units include a pattern sailing controller 41, a passing point computer 42, an expected sailing water area computer 43, a pattern sailing intervener 44, and a notification controller 45.

When the pattern sailing mode is commanded by the pattern sailing mode button 26B, the pattern sailing controller 41 generates a propulsion device control command to sail the watercraft in the predetermined sailing pattern. The predetermined sailing pattern may be a single sailing pattern, or may be selected from a plurality of sailing patterns. Examples of the predetermined sailing pattern include the zig-zag pattern and the spiral pattern. The zig-zag pattern is such that the watercraft is sailed zig-zag along a reference line (defined, for example, as a center line). The spiral pattern is such that the watercraft is sailed along a spiral course about a reference position gradually away from the reference position. The spiral pattern may be selectable from a clockwise spiral pattern and a counterclockwise spiral pattern.

Parameters may be set for the pattern sailing. Exemplary parameters for the zig-zag pattern include the amplitude of the zig-zag pattern with respect to the reference line defined as the center line, the return angle of the zig-zag pattern at each turn, the number of turns of the zig-zag pattern, and a linear distance between the start point and the end point of the zig-zag pattern, and at least one of these parameters may be settable. Exemplary parameters for the spiral pattern include a spacing between adjacent equidistant line portions of the spiral pattern, a distance between the reference position and the end point of the spiral pattern, and the number of turns about the reference position, and at least one of these parameters may be settable.

The pattern sailing controller 41 applies sailing pattern information and parameter information for the sailing pattern to the passing point computer 42.

The sailing pattern information for the zig-zag pattern includes zig-zag pattern specification information and reference line information for the zig-zag pattern. If the route following mode is not commanded by the route following mode button 26A, the pattern sailing controller 41 applies reference line information indicating a half line extending from the current position of the watercraft in the current azimuth direction to the passing point computer 42. Information of the current position of the watercraft and information of the current azimuth of the watercraft are acquired from the position detector 24 and the azimuth meter 25, respectively. If the route following mode is commanded by the route following mode button 26A, the pattern sailing controller 41 applies the route information indicating the route set by the route setter 22 as the reference line information to the passing point computer 42. The route information includes information of at least one destination and information of at least one waypoint. The route is defined by connecting the destination and the waypoint, and is used as the reference line for the zig-zag pattern.

The sailing pattern information for the spiral pattern includes spiral pattern specification information and reference position information. If the route following mode is not commanded by the route following mode button 26A, the pattern sailing controller 41 applies reference position information indicating the current position of the watercraft to the passing point computer 42. Information of the current position of the watercraft is acquired from the position detector 24. If the route following mode is commanded by the route following mode button 26A, the pattern sailing controller 41 applies reference position information indicating the route set by the route setter 22 to the passing point computer 42. In this case, the reference position information includes waypoints defining the route. If a distance between an adjacent pair of waypoints is greater than a predetermined threshold, one or more auxiliary waypoints are provided on a route connecting the adjacent pair of waypoints, and the auxiliary waypoints may be added to the reference position information. The auxiliary waypoints may be generated by the pattern sailing controller 41, or may be generated by the passing point computer 42.

The passing point computer 42 computes a plurality of passing points through which the watercraft is to sequentially pass in accordance with time (more precisely, computes information of the positions of the passing points).

If the zig-zag pattern sailing is commanded, the plurality of passing points are computed so that the watercraft is sailed to follow a sailing path of the zig-zag pattern along the reference line defined as the center line. The reference line is a route which is set when the route following mode is selected. Specifically, the reference line may be a line segment extending from the current position to the first waypoint, a line segment extending between adjacent waypoints, or a line segment extending from the last waypoint to the destination. If the route following mode is not selected, the reference line is the half line extending from the current watercraft position in the current watercraft azimuth direction.

If the spiral pattern sailing is commanded, the plurality of passing points are computed so that the watercraft is sailed to follow a sailing path of the spiral pattern about the reference position. If the route following mode is selected, the reference position may be the current watercraft position, any of the waypoints on the route, any of the auxiliary waypoints, or the destination. For example, the first reference position may be a waypoint closest to the current position. The second reference position may be a waypoint or an auxiliary waypoint closer to the current position on the route, and the third reference position may be a waypoint or an auxiliary waypoint next to the second reference position on the route. If there is neither the next waypoint nor the next auxiliary waypoint on the route, the destination may be the reference position. If the watercraft is sailed in the spiral pattern about a certain reference position and a distance to the next reference position becomes less than a predetermined threshold, the reference position is changed to the next one, and the spiral pattern sailing about the next reference position is started. The passing points are computed to define such a sailing pattern. If the route following mode is not selected, the passing points are computed so that the watercraft is sailed to follow the sailing path of the spiral pattern about the current watercraft position defined as the reference position.

If the route following mode is selected and the pattern sailing mode is not selected, the pattern sailing controller 41 acquires the route information from the route setter 22, and applies the route information to the passing point computer 42. The passing point computer 42 computes the passing points so that the watercraft is sailed toward the first waypoint from the current position and then to the destination through the one or more waypoints including the first waypoint.

The computed passing points are applied to the pattern sailing controller 41. The pattern sailing controller 41 generates a propulsion device control command to control the propulsion device 10 to sail the watercraft sequentially through the passing points in accordance with time. Specifically, the pattern sailing controller 41 compares the current position of the watercraft with the next passing point through which the watercraft is next to pass, then generates a propulsion device control command so as to direct the watercraft toward the next passing point from the current position, and applies the propulsion device control command to the propulsion device controller 21. The propulsion device controller 21 correspondingly controls the propulsion device 10 so that the watercraft is sailed along a sailing path passing sequentially through the passing points.

The expected sailing water area computer 43 computes a water area (expected sailing water area) in which the watercraft is expected to sail. The expected sailing water area computer 43 may be an expected sailing path computer which acquires information of the passing points from the passing point computer 42, and computes an expected sailing path defined by connecting the passing points as the expected sailing water area. Further, the expected sailing water area computer 43 may compute an area encompassing the expected sailing path as the expected sailing water area. Specifically, when the zig-zag pattern sailing is commanded, a band-shaped zone defined by a pair of envelope lines contacting an expected sailing path of the zig-zag pattern along the reference line from the opposite sides of the reference line may be computed as the expected sailing water area. When the spiral pattern sailing is commanded with the route following mode selected, a band-shaped zone defined by a pair of envelope lines contacting a plurality of spiral patterns respectively drawn about the reference positions from opposite sides of the route may be computed as the expected sailing water area.

The pattern sailing intervener 44 monitors whether or not the obstacle sensor 27 detects the obstacle interfering with the expected sailing water area. When the obstacle sensor 27 is able to detect the obstacle within the predetermined detection area around the watercraft, the pattern sailing intervener 44 monitors whether or not the obstacle is present in an overlap between the detection area and the expected sailing water area. The pattern sailing intervener 44 may monitor whether or not the obstacle is detected in the expected sailing water area. Further, the pattern sailing intervener 44 may detect not only the obstacle present within the expected sailing water area but also an obstacle approaching within a predetermined distance from the expected sailing water area, as the obstacle interfering with the sailing water area.

If the obstacle interfering with the expected sailing water area is detected during the pattern sailing, the pattern sailing intervener 44 suspends or cancels the pattern sailing. The term "suspend" means that the pattern sailing is temporarily stopped and is assumed to be resumed later. The term "cancel" means that the pattern sailing is stopped and is not assumed to be resumed. If the obstacle interfering with the expected sailing water area is detected when the pattern sailing mode is not selected in the route following mode, the pattern sailing intervener 44 may suspend or cancel the route following mode.

If the obstacle interfering with the expected sailing water area is detected and the pattern sailing is suspended or canceled, the notification controller 45 notifies the route setter 22 of the suspension or the cancelation of the pattern sailing, and causes the display device 22A to display the notification for the user. Further, if the obstacle interfering with the expected sailing water area is detected and the route following mode is suspended or canceled, the notification controller 45 notifies the route setter 22 of the suspension or the cancelation of the route following mode, and causes the display device 22A to display the notification for the user. The notification for the user may be achieved not only by the display but also by an audible signal such as an alarm sound.

FIG. 3 is a diagram showing an exemplary display of the display device 22A for explaining a route setting operation to be performed by the route setter 22 by way of example. A nautical chart including land 51 and a waterway region 52 in which the watercraft is permitted to sail is displayed on the display device 22A. On the nautical chart, a watercraft icon 50 indicating the current position of the watercraft is displayed. The user is able to specify one or more waypoints W (W1, W2, and at least one destination D on the displayed nautical chart by touching the display screen (precisely, the touch panel 22B). The route setter 22 displays a route R represented by line segments connecting the waypoints W and the destination D sequentially in the order of proximity to the current position of the watercraft on the nautical chart. The user is able to modify the route R, as required, by moving any of the waypoints W and/or the destination D on the display screen with reference to the route R displayed on the nautical chart. Information of the route R thus set (route information) is applied to the autopilot controller 26.

FIG. 4 is a diagram for explaining exemplary pattern sailing to be carried out with the route following mode not selected, particularly showing the zig-zag pattern sailing by way of example. A reference line RL is defined by a half line extending from the current position of the watercraft in the current azimuth direction of the watercraft. The zig-zag pattern is repeated along the reference line RL with a set zig-zag amplitude Wd at a set return angle α. The passing point computer 42 sets passing points P (P1, P2, P3, at positions each requiring a turn. Around each of the turning positions, the passing points P are set at shorter intervals. Thus, the watercraft 60 smoothly changes its course while traveling forward. The expected sailing water area computer 43 computes an expected sailing path TP (an example of the expected sailing water area) by connecting the passing points P in chronological order. As described above, the expected sailing water area computer 43 may compute, as the expected sailing water area, a region defined between a pair of envelope lines EL1, EL2 which envelope the expected sailing path TP from opposite sides of the reference line RL.

FIG. 5 shows exemplary zig-zag pattern sailing to be carried out with the route following mode selected. When the route following mode is selected, the watercraft 60 is sailed in a zig-zag pattern along a route R defined as reference lines RL1, RL2 by connecting waypoints W and a destination D. For example, when the watercraft 60 reaches a waypoint W1 closest to the current position of the watercraft 60, the zig-zag pattern sailing may be started with respect to the reference line RL1 defined by a line extending from the waypoint W1 to the next waypoint W2. Further, after the watercraft 60 is sailed in the zig-zag pattern beyond the next waypoint W2, the zig-zag pattern sailing may be carried out with respect to the reference line RL2 defined by a line extending from the waypoint W2 to the next waypoint (in the example of FIG. 5, the destination D). By repeating this operation while repeatedly crossing the reference lines RL1, RL2 connecting the waypoints W, the watercraft 60 is sailed in the zig-zag pattern along the route R. The passing point computer 42 sets passing points P (P1, P2, at turning positions for the pattern sailing. Then, the expected sailing water area computer 43 computes an expected sailing path TP connecting these passing points P. As described above, the expected sailing path TP is an example of the expected sailing water area. Further, a band-shaped zone defined between a pair of envelope lines EL1 EL2 enveloping the expected sailing path TP from opposite sides of the route R is another example of the expected sailing water area.

FIG. 6 shows exemplary spiral pattern sailing to be carried out with the route following mode not selected. A reference position RP is the current position of the watercraft 60. The passing point computer 42 computes a plurality of passing points P (P1, P2, P3, through which a spiral pattern is drawn about the reference position RP. Thus, the watercraft 60 smoothly changes its course to follow a sailing path of the spiral pattern while traveling forward. The expected sailing water area computer 43 computes an expected sailing path TP (an example of the expected sailing water area) by connecting the passing points P in chronological order.

FIG. 7 shows exemplary spiral pattern sailing to be carried out with the route following mode selected. When the route following mode is selected, the watercraft 60 is sailed along a route R defined by connecting waypoints W (W1, W2, and a destination D, while following a sailing path of a spiral pattern. For example, the passing point computer 42 may define a waypoint W1 closest to the current position of the watercraft 60 as the first reference position RP1. If the next waypoint is not present within a predetermined distance from the first reference position RP1, the passing point computer 42 sets an auxiliary waypoint Wp1 at a position spaced the predetermined distance from the first reference position RP1 on the route R, and defines the auxiliary waypoint Wp1 as the next reference position RP2. If the next waypoint is present within the predetermined distance from the first reference position RP1, the passing point computer 42 defines this waypoint as the next reference position. In this manner, a plurality of reference positions RP (RP1, RP2, are set by additionally defining auxiliary waypoints Wp1, Wp2 as required.

The passing point computer 42 computes a plurality of passing points P through which a spiral pattern is drawn about the first reference position RP1. If any of the passing points P is present within the predetermined distance from the next reference position RP2, the passing point computer 42 computes a plurality of passing points P through which a spiral pattern is drawn about the reference position RP2. In this manner, the passing point computer 42 computes passing points P through which spiral patterns are respectively drawn about the reference positions RP (RP1, RP2, Thus, the watercraft 60 is sailed along the route R thus set while traveling spirally about the waypoints W W2, and the auxiliary waypoints Wp (wp1, Wp2, . . . ).

The expected sailing water area computer 43 computes an expected sailing path (an example of the expected sailing water area) TP by connecting the passing points P in chronological order. As described above, the expected sailing water area computer 43 may compute, as the expected sailing water area, a region defined between a pair of envelope lines EL1, EL2 enveloping the expected sailing path TP from opposite sides of the route R.

FIGS. 8A and 8B are diagrams for explaining an operation to be performed by the pattern sailing intervener 44 by way of example. In this example, the detection area 27d of the obstacle sensor 27 is defined within a predetermined radius about the watercraft 60. When an obstacle (e.g., land 65) interfering with the expected sailing water area (e.g., the expected sailing path TP) is detected during the zig-zag pattern sailing (see FIG. 8A), the pattern sailing intervener 44 suspends the pattern sailing. For example, the pattern sailing intervener 44 notifies the passing point computer 42 that a turn 66 for the zig-zag pattern sailing should be skipped once (see FIG. 8B). In response to the notification, the passing point computer 42 recomputes the passing points P as a modification so as to skip the turn 66 near the detected obstacle. Based on the passing points P thus recomputed, the expected sailing water area computer 43 newly computes an expected sailing water area (e.g., an expected sailing path TP). Then, the pattern sailing intervener 44 determines whether or not an obstacle interfering with the newly computed expected sailing water area is detected. If the obstacle is not detected, the watercraft is sailed to pass through the passing points P recomputed for the modification. A situation before the modification is shown in FIG. 8A, and a situation after the modification is shown in FIG. 8B. By skipping the turn 66 once, the zig-zag pattern sailing is temporarily suspended near the obstacle so that the watercraft 60 is sailed along a reference line RL.

If an obstacle interfering with the newly computed expected sailing water area is detected, the pattern sailing intervener 44 notifies the passing point computer 42 that another turn should be skipped. In response to the notification, the passing point computer 42 recomputes the passing points P in order to skip another turn. Based on the passing points P thus recomputed, an expected sailing water area is newly computed, and it is determined whether or not an obstacle interfering with the newly computed expected sailing water area is detected. By repeating this operation, the passing point computer 42 recomputes the passing points P so that the watercraft is sailed along a course avoiding the obstacle detected by the obstacle sensor 27. Then, the pattern sailing controller 41 suspends the pattern sailing in a region possibly interfering with the obstacle. In a state such that the obstacle sensor 27 no longer detects the obstacle interfering with the expected sailing water area, the pattern sailing controller 41 generates a propulsion device control command to resume the zig-zag pattern sailing.

In FIG. 8B, the reference line RL is illustrated as a straight line but, in the route following mode, the reference line RL may be angled or curved. In the route following mode, the watercraft can be sailed in the zig-zag pattern along the set route R. When a possibly interfering obstacle is detected, the zig-zag pattern sailing is temporarily suspended to avoid the obstacle, and then the zig-zag pattern sailing is resumed.

Figure 9:
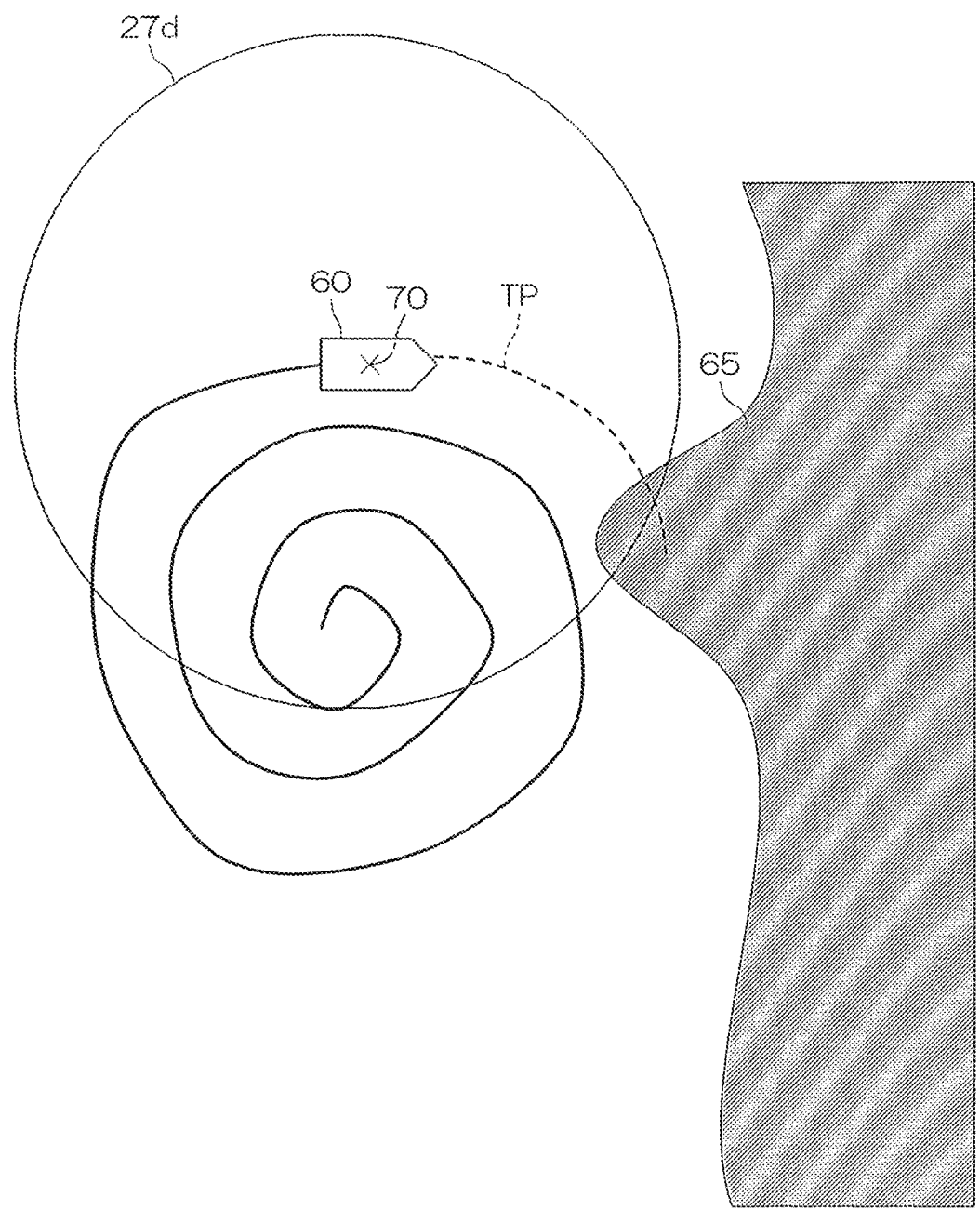
FIG. 9 is a diagram for explaining another exemplary operation to be performed by the pattern sailing intervener with the route following mode not selected.

FIG. 9 is a diagram for explaining another operation to be performed by the pattern sailing intervener with the route following mode not selected. If an obstacle (e.g., land 65) is detected in an expected sailing water area (e.g., an expected sailing path TP) during the spiral pattern sailing, the pattern sailing intervener 44 cancels the pattern sailing at a position sufficient to avoid the obstacle. For example, the pattern sailing intervener 44 determines an obstacle interference avoidance point 70 at which the obstacle interference can be prevented in advance, and cancels passing points subsequent to the avoidance point 70. When the watercraft 60 reaches the avoidance point 70, a propulsion device control command to decelerate and stop the watercraft 60 is generated. Thus, the automatic spiral pattern sailing is canceled before the watercraft 60 reaches the obstacle.

Figure 10:
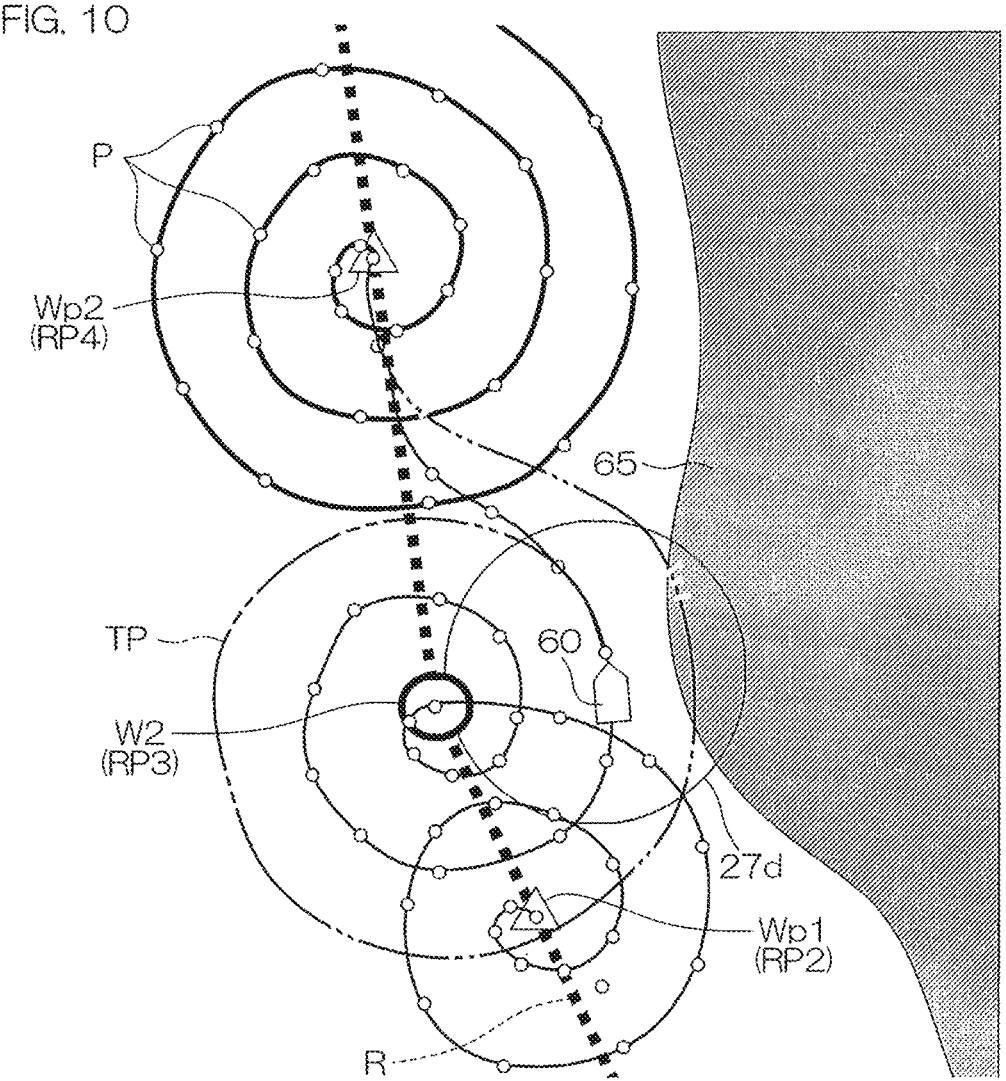
FIG. 10 shows an exemplary operation to be performed by the pattern sailing intervener when the spiral pattern sailing is carried out with the route following mode selected.

FIG. 10 shows an exemplary operation to be performed by the pattern sailing intervener 44 when the spiral pattern sailing is carried out with the route following mode selected. When an obstacle (e.g., land 65) interfering with an expected sailing water area (e.g., an expected sailing path TP) is detected during the spiral pattern sailing along a set route R, the pattern sailing intervener 44 suspends the pattern sailing. When the obstacle is detected in the expected sailing water area (e.g., on the expected sailing path TP) during the spiral pattern sailing about a certain reference position RP3, for example, the pattern sailing intervener 44 notifies the passing point computer 42 that the spiral pattern sailing about the reference position RP3 should be partly skipped.

In response to the notification, the passing point computer 42 cancels passing points defining the expected sailing path TP (indicated by a two-dot-and-dash line in FIG. 10) which may interfere with the obstacle. Then, the passing point computer 42 recomputes the passing points P so as to partly skip the spiral pattern sailing about the reference position RP3 and direct the watercraft toward the next reference position RP4 so that the spiral pattern sailing can be resumed from the next reference position RP4. Based on the passing points P thus recomputed, the expected sailing water area computer 43 newly computes an expected sailing water area (e.g., an expected sailing path). Then, the pattern sailing intervener 44 determines whether or not an obstacle interfering with the newly computed expected sailing water area is detected. If the obstacle is not detected, the pattern sailing is carried out so that the watercraft passes through the recomputed passing points P. By partly skipping the spiral pattern sailing about one of the reference positions, the spiral pattern sailing is temporarily suspended near the obstacle, and the watercraft 60 is sailed along the set route R.

If the obstacle interfering with the newly computed expected sailing water area is detected, the pattern sailing intervener 44 notifies the passing point computer 42 that the spiral pattern sailing about the next reference position RP4 should be skipped. In response to the notification, the passing point computer 42 recomputes the passing points P so as to skip the spiral pattern sailing about the reference position RP4 so that the spiral pattern sailing is resumed from the next reference position. Based on the passing points P thus recomputed, an expected sailing water area is newly computed, and it is determined whether or not an obstacle interfering with the newly computed expected sailing water area is detected.

By repeating this operation, the passing point computer 42 recomputes the passing points P so as to provide an obstacle avoidance course which causes the watercraft to avoid the obstacle detected by the obstacle sensor 27. Then, the pattern sailing controller 41 suspends the spiral pattern sailing in a region possibly interfering with the obstacle. In a state such that the obstacle sensor 27 no longer detects the obstacle interfering with the expected sailing water area, the pattern sailing controller 41 generates a propulsion device control command to resume the spiral pattern sailing. Thus, the watercraft is sailed in the spiral pattern along the set route. When the obstacle is detected, the spiral pattern sailing is temporarily suspended to avoid the obstacle, and then the spiral pattern sailing is resumed.

Figure 11:
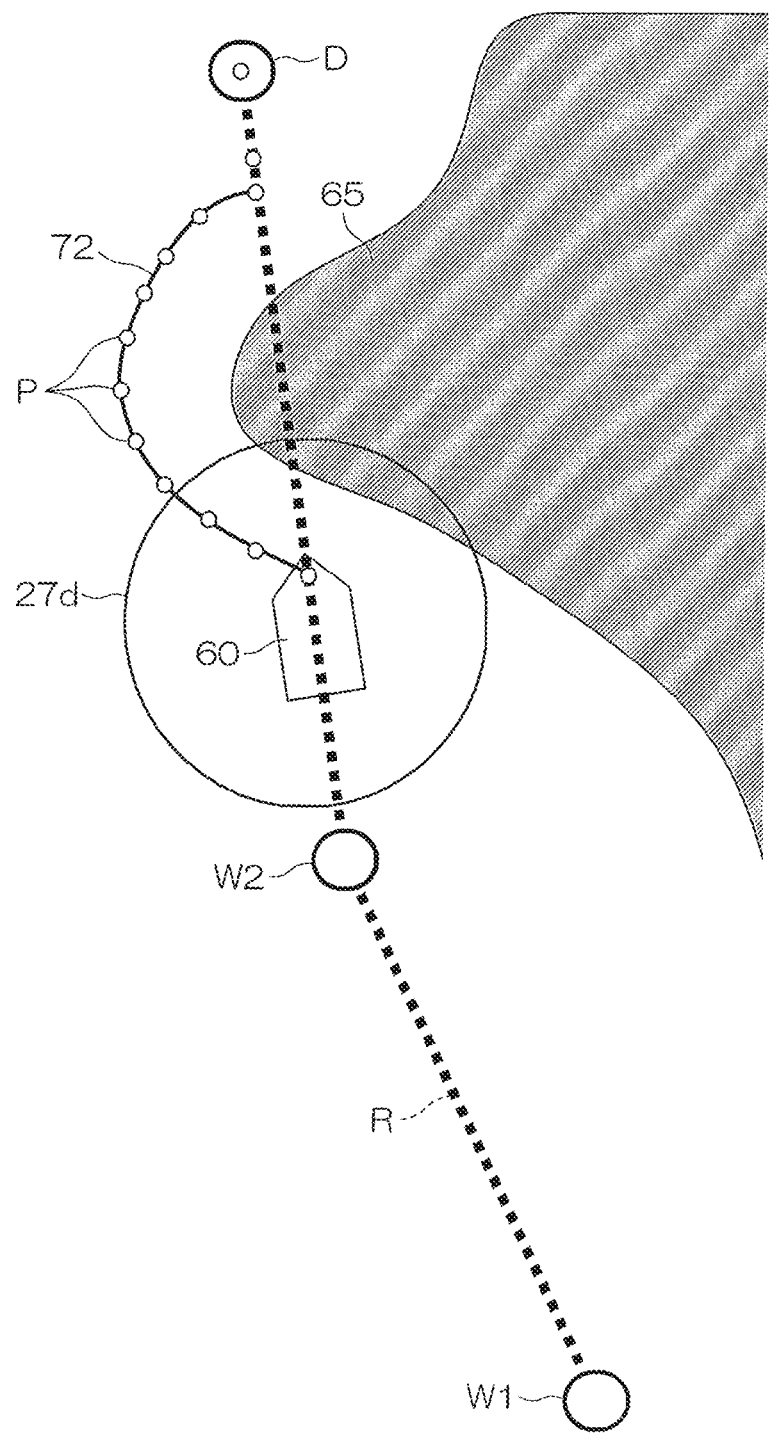
FIG. 11 is a diagram for explaining an exemplary operation to be performed when the pattern sailing is not commanded with the route following mode selected.

FIG. 11 is a diagram for explaining an exemplary operation to be performed when the pattern sailing is not commanded with the route following mode selected. There is a possibility that, when a watercraft 60 is sailed along a set route R, the obstacle sensor 27 detects an obstacle (e.g., land 65) on the route. In this case, the passing point computer 42 recomputes passing points P present on a portion of the route R near the obstacle. That is, the passing point computer 42 computes passing points P for an obstacle avoidable route 72. Based on the passing points P thus computed, the pattern sailing controller 41 generates a propulsion device control command so that the watercraft 60 avoids the obstacle. For example, the obstacle avoidable route 72 may be a route which is spaced a predetermined distance from the detected obstacle.

According to a preferred embodiment of the present invention, as described above, the user operates the pattern sailing mode button 26B to provide a command so that the pattern sailing controller 41 generates the propulsion device control command for the pattern sailing of the watercraft. On the other hand, the expected sailing water area computer 43 computes the expected sailing water area for the pattern sailing. When the obstacle sensor 27 detects the obstacle interfering with the expected sailing water area around the watercraft, the pattern sailing intervener 44 intervenes the pattern sailing to suspend or cancel the pattern sailing. This assists the user in properly coping with a situation around the watercraft during the pattern sailing, making it possible to more conveniently maneuver the watercraft by utilizing the pattern sailing function.

According to a preferred embodiment of the present invention, the passing point computer 42 computes the passing points through which the watercraft is to pass in accordance with time. When the pattern sailing is commanded, the passing point computer 42 computes the passing points so that the watercraft is sailed along the sailing path of the commanded pattern. Then, the pattern sailing controller 41 generates the propulsion device control command to cause the watercraft to pass sequentially through the passing points. Further, the expected sailing water area computer 43 computes the expected sailing path which passes through the passing points. This expected sailing path is utilized as the expected sailing water area. That is, when the obstacle sensor 27 detects the obstacle interfering with the expected sailing path, the pattern sailing is suspended or canceled. Thus, the information of the expected sailing water area is obtained by utilizing the information of the passing points computed for the pattern sailing. Therefore, the pattern sailing function is more conveniently utilized with a smaller amount of computation.

According to a preferred embodiment of the present invention, when the pattern sailing intervener 44 suspends or cancels the pattern sailing, the passing point computer 42 recomputes the passing points for defining the obstacle avoidance course which causes the watercraft to avoid the obstacle detected by the obstacle sensor 27 (see FIGS. 8B and 10). Thus, the obstacle is avoided by the automatic watercraft maneuvering so that the pattern sailing function is utilized more conveniently.

According to a preferred embodiment of the present invention, in a state such that the obstacle sensor 27 no longer detects the obstacle interfering with the expected sailing water area after the pattern sailing intervener 44 suspends the pattern sailing, the pattern sailing controller 41 resumes the pattern sailing. That is, the pattern sailing is resumed when the obstacle interfering with the expected sailing water area is no longer detected. Thus, the suspension and the resumption of the pattern sailing is properly and automatically achieved so that the pattern sailing function is utilized more conveniently.

According to a preferred embodiment of the present invention, the user operates the route setter 22 to set the watercraft sailing route. Then, the route following mode for sailing the watercraft along the route is selected by the route following mode button 26A. When the pattern sailing is commanded in the route following mode, the pattern sailing controller 41 sails the watercraft in the predetermined sailing pattern along the route thus set. That is, the pattern sailing is carried out on the set route. Thus, the pattern sailing function is more conveniently utilized. Particularly, the pattern sailing function is more easily utilized by setting the route in consideration of a surrounding environment around a region in which the pattern sailing function is to be utilized.

When the route is not set, i.e., when the route following mode is not selected, the pattern sailing controller 41 generates the propulsion device control command for the pattern sailing with respect to the current position of the watercraft. Even in this case, when the obstacle sensor 27 detects the obstacle interfering with the expected sailing water area, the pattern sailing is properly suspended or canceled. Therefore, the pattern sailing function is easily utilized even if the route is not set.

Thus, a preferred embodiment of the present invention provides the watercraft maneuvering control apparatus 20 and the watercraft maneuvering system including the watercraft maneuvering control apparatus 20, which make it possible to more conveniently maneuver the watercraft by utilizing the pattern sailing function.

While preferred embodiments of the present invention have thus been described, the present invention may be embodied in other ways.

In a preferred embodiment described above, the obstacle interfering with the expected sailing water area is detected in the detection area 27d of the obstacle sensor 27, and the pattern sailing is suspended or canceled by way of example. Alternatively, an area having a smaller size than the detection area 27d of the obstacle sensor 27 may be defined as the detection area for determining whether or not the interference between the expected sailing water area and the obstacle occurs in the smaller detection area. As described above, the interference between the expected sailing water area and the obstacle means not only that the obstacle overlaps with the expected sailing water area, but also that a distance between the expected sailing water area and the obstacle is less than a predetermined distance.

Further, the obstacle sensor is not limited to the LiDAR, the radar, and the millimeter wave radar. For example, an obstacle such as land, bridge pier, jetty, breakwater, and pier may be detected around the current position of the watercraft by using a GNSS (global navigation satellite system) and map data in combination. This arrangement is also an example of the obstacle sensor. For example, if a distance between the watercraft and a pier specified as the destination (object) by the route setter 22 is less than the predetermined distance, the destination (object) may be regarded as the obstacle, and the pattern sailing may be suspended or canceled.

In a preferred embodiment described above, the expected sailing path and the region between the envelope lines EL1 and EL2 are each used as the expected sailing water area by way of example, but a band-shaped zone extending along the expected sailing path and having a predetermined width on opposite sides of the expected sailing path may be used as the expected sailing water area. In other words, the expected sailing path (expected sailing water area) may be a band-shaped zone extending along a center line defined by connecting a plurality of passing points and having a predetermined width on opposite sides of the center line.

In a preferred embodiment described above, the zig-zag pattern and the spiral pattern are used as the pattern sailing. However, the preferred embodiments described above may be applied to other sailing patterns. Specific examples of the sailing patterns include a round pattern, a rectangular pattern, and an infinity symbol (00) pattern.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft maneuvering control apparatus for controlling a propulsion device of a watercraft, the watercraft maneuvering control apparatus comprising:
    an obstacle sensor to detect an obstacle around the watercraft;
    a pattern sailing commander operable by a user to provide a command to sail the watercraft in a predetermined sailing pattern; and
    a controller configured or programmed to control the propulsion device and to function as:
        a pattern sailing controller to control the propulsion device to sail the watercraft in the predetermined sailing pattern according to the command provided by the pattern sailing commander;
        an expected sailing water area computer to compute an expected sailing water area when the watercraft is sailed in the predetermined sailing pattern according to the command provided by the pattern sailing commander; and
        a pattern sailing intervener to suspend or cancel the predetermined pattern sailing of the watercraft when the obstacle sensor detects an obstacle that interferes with the expected sailing water area; wherein
    the predetermined sailing pattern includes a zig-zag pattern in which the watercraft is sailed zig-zag along a reference line defined as a center line; and
    the expected sailing water area includes a band-shaped zone defined by a pair of envelope lines contacting an expected zig-zag sailing path along the reference line from opposite sides of the reference line.

2. The watercraft maneuvering control apparatus according to claim 1, wherein
    the controller is configured or programmed to function as a passing point computer to compute a plurality of passing points through which the watercraft is to pass sequentially in accordance with time;
    the passing point computer computes the plurality of passing points so that the watercraft follows a sailing path of the predetermined sailing pattern according to the command provided by the pattern sailing commander;
    the pattern sailing controller controls the propulsion device so that the watercraft sequentially passes through the plurality of passing points; and
    the expected sailing water area computer computes, as the expected sailing water area, an expected sailing path which passes through the plurality of passing points.

3. The watercraft maneuvering control apparatus according to claim 2, wherein, when the pattern sailing intervener suspends or cancels the predetermined pattern sailing of the watercraft, the passing point computer recomputes the plurality of passing points to provide an obstacle avoidance course which causes the watercraft to avoid the obstacle detected by the obstacle sensor.

4. The watercraft maneuvering control apparatus according to claim 1, wherein, after the pattern sailing intervener suspends the predetermined pattern sailing of the watercraft, the pattern sailing controller controls the propulsion device to resume the predetermined pattern sailing of the watercraft in a state such that the obstacle sensor no longer detects the obstacle that interferes with the expected sailing water area.

5. A watercraft maneuvering system for a watercraft, the watercraft maneuvering system comprising:
- a propulsion device;
- an obstacle sensor to detect an obstacle around the watercraft;
- a pattern sailing commander operable by a user to provide a command to sail the watercraft in a predetermined sailing pattern; and
- a controller configured or programmed to control the propulsion device and to function as:
  - a pattern sailing controller to control the propulsion device to sail the watercraft in the predetermined sailing pattern according to the command provided by the pattern sailing commander;
  - an expected sailing water area computer to compute an expected sailing water area when the watercraft is sailed in the predetermined sailing pattern according to the command provided by the pattern sailing commander; and
  - a pattern sailing intervener to suspend or cancel the predetermined pattern sailing of the watercraft when the obstacle sensor detects an obstacle that interferes with the expected sailing water area; wherein
- the predetermined sailing pattern includes a zig-zag pattern in which the watercraft is sailed zig-zag along a reference line defined as a center line; and
- the expected sailing water area includes a band-shaped zone defined by a pair of envelope lines contacting an expected zig-zag sailing path along the reference line from opposite sides of the reference line.

6. The watercraft maneuvering system according to claim 5, wherein
- the controller is configured or programmed to function as a passing point computer to compute a plurality of passing points through which the watercraft is to pass sequentially in accordance with time;
- the passing point computer computes the plurality of passing points so that the watercraft follows a sailing path of the predetermined sailing pattern according to the command provided by the pattern sailing commander;
- the pattern sailing controller controls the propulsion device so that the watercraft sequentially passes through the plurality of passing points; and
- the expected sailing water area computer computes, as the expected sailing water area, an expected sailing path which passes through the plurality of passing points.

7. The watercraft maneuvering system according to claim 6, wherein, when the pattern sailing intervener suspends or cancels the predetermined pattern sailing of the watercraft, the passing point computer recomputes the plurality of passing points to provide an obstacle avoidance course which causes the watercraft to avoid the obstacle detected by the obstacle sensor.

8. The watercraft maneuvering system according to claim 5, wherein, after the pattern sailing intervener suspends the predetermined pattern sailing of the watercraft, the pattern sailing controller controls the propulsion device to resume the predetermined pattern sailing of the watercraft in a state such that the obstacle sensor no longer detects the obstacle that interferes with the expected sailing water area.

* * * * *